(12) United States Patent
Reich et al.

(10) Patent No.: US 6,691,014 B2
(45) Date of Patent: Feb. 10, 2004

(54) METHOD AND DEVICE FOR CONTROLLING THE CORNERING SPEED OF A VEHICLE

(75) Inventors: Thomas Reich, Hannover (DE); Georg Schmidt, Wedel (DE)

(73) Assignee: WABCO GmbH & Co. OHG, Hannover (DE)

( * ) Notice: Subject to any disclaimer, the term of this patent is extended or adjusted under 35 U.S.C. 154(b) by 0 days.

(21) Appl. No.: 10/097,235

(22) Filed: Mar. 13, 2002

(65) Prior Publication Data

US 2002/0161505 A1 Oct. 31, 2002

(30) Foreign Application Priority Data

Mar. 14, 2001 (DE) .......................................... 101 12 150

(51) Int. Cl.$^7$ ............................................... B62D 37/00
(52) U.S. Cl. ........................................... 701/70; 701/93
(58) Field of Search .............................. 701/70, 72, 93; 303/146

(56) References Cited

U.S. PATENT DOCUMENTS

| | | | |
|---|---|---|---|
| 5,206,808 A | | 4/1993 | Inoue et al. |
| 5,893,896 A | * | 4/1999 | Imamura et al. ............... 701/70 |
| 5,927,421 A | * | 7/1999 | Fukada ........................ 180/197 |
| 6,233,513 B1 | * | 5/2001 | Furukawa et al. ............. 701/74 |

FOREIGN PATENT DOCUMENTS

| | | | |
|---|---|---|---|
| DE | 196 49 137 A1 | 6/1997 | |
| DE | 198 14 381 A1 | 10/1998 | |
| DE | 197 33 674 A1 | 2/1999 | |
| DE | 198 59 953 A1 | 6/2000 | |
| DE | 100 15 682 A1 | 2/2001 | |
| EP | 0 914 997 A2 | 5/1999 | |
| EP | 0 945 320 A1 | 9/1999 | |
| JP | 05338461 A | * 12/1993 | ......... B60K/17/348 |

* cited by examiner

*Primary Examiner*—Michael J. Zanelli
(74) *Attorney, Agent, or Firm*—Kramer Levin Naftalis & Frankel LLP

(57) ABSTRACT

The invention relates to a method and a device for controlling the cornering speed of a vehicle, with determination of the lateral acceleration and of the speed of the vehicle. In order to achieve a simple but effective capability of adjusting the vehicle speed to an optimum value, the yaw angular velocity is additionally determined, and a body slip angle is determined from the lateral acceleration, yaw angular velocity and vehicle speed. The body slip angle is compared with a threshold value. If the body slip angle exceeds this threshold, the set speed of the vehicle is reduced from the instantaneous actual speed, in a manner proportional to the body slip angle. If the body slip angle is below the threshold, the speed is released once again, or in other words the set speed is carried to the actual value of the speed; the driver can then accelerate once again. Adjustment of the set speed is achieved via adaptation of the engine torque. If the actual and set speeds differ, the engine torque is varied by a PD controller in such a way that the actual speed is adjusted to the set speed.

19 Claims, 1 Drawing Sheet

METHOD AND DEVICE FOR CONTROLLING THE CORNERING SPEED OF A VEHICLE

BACKGROUND OF THE INVENTION

The present invention relates to a method and device for controlling the cornering speed of a vehicle.

If a vehicle is traveling on surfaces having low coefficients of friction, instabilities such as fishtailing at the rear axle can occur during steering maneuvers such as driving on a curve or during evasive maneuvers, because the transverse forces on the wheels are too small to ensure stable cornering behavior. This oversteering behavior must be compensated for by suitable corrective control actions.

German Patent Application 19907633 teaches a method and a device for stabilization of a vehicle, especially for prevention of rollover of a vehicle around a vehicle axis oriented in a longitudinal direction of the vehicle, especially during cornering. For this purpose, a variable describing the transverse dynamics of the vehicle is determined. This variable is compared with at least one characteristic value, especially with a threshold value for this variable. If the variable describing the transverse dynamics of the vehicle is larger than the characteristic value or equal to the characteristic value, the speed of the vehicle is reduced to a predefinable limit value of cornering speed or is maintained at a predefinable limit value of cornering speed by braking actions on at least one wheel and/or by engine actions, by which the engine's torque output is reduced, and/or by retarder actions. A variable describing the lateral acceleration is used as the variable describing the transverse dynamics of a vehicle; this variable being determined as a function of the vehicle's speed and steering angle.

For an exact determination of the limit value of cornering speed, it is necessary to know the coefficient of friction. If inhomogeneous coefficients of friction are present, it would be necessary to determine the coefficient of friction for each wheel. Furthermore, the limit value of cornering speed at which the wheel completely or partly loses its lateral traction also depends on acceleration and braking slip. Since these parameters are not taken into consideration in the known method and known device, the method and the device are suitable to only a limited extent in practice.

Accordingly, it is desired to provide a method and device or apparatus for controlling the cornering speed of a vehicle, while overcoming the disadvantages associated with prior art methods and devices.

SUMMARY OF THE INVENTION

Generally speaking, in accordance with the present invention, an improved method and device or apparatus are provided for controlling the cornering speed of a vehicle, whereby the vehicle can drive stably with maximum traction on a curve.

In one aspect of the present invention, a method for controlling the cornering speed of a vehicle is provided including the steps of determining a body slip angle of the vehicle and comparing the body slip angle with a body slip-angle threshold value, and in response to a deviation of the body slip angle from the body slip-angle threshold value taking a corrective action with respect to the engine to control the cornering speed of the vehicle.

In another aspect of the present invention, the body slip angle of the vehicle is calculated using the vehicle's lateral acceleration, yaw angular velocity and actual speed.

In yet another aspect of the present invention a device or apparatus is provided for controlling the cornering speed of a vehicle having sensors for determining the speed, the lateral acceleration and the yaw angular velocity of the vehicle, a computing device for computing a body slip angle from the lateral acceleration, the yaw angular velocity and the actual speed of the vehicle, a threshold circuit for comparison of the body slip angle with a body slip-angle threshold value, a weighting circuit which is connected to the output side of the threshold circuit, and which determines a correction value proportional to the determined body slip angle, a first summation point, in which a set speed of the vehicle is reduced from the actual speed of the vehicle by the correction value, a second summation point in which the actual speed of the vehicle is compared with the set speed of the vehicle in order to calculate a value of the control deviation, and a PD controller for adjusting the engine torque as a function of the value of the control deviation.

Accordingly, an object of the present invention is to provide a simple, effective and practical method and apparatus for controlling the cornering speed of a vehicle, whereby the vehicle can drive stably with maximum traction on a curve.

It is a further object of the present invention to provide a device or an apparatus for performing the method.

It is another object of the present invention to provide a method and an apparatus for controlling the cornering speed of a vehicle by controlling the vehicle's engine as a function of the body slip angle.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENT

Figure 1:
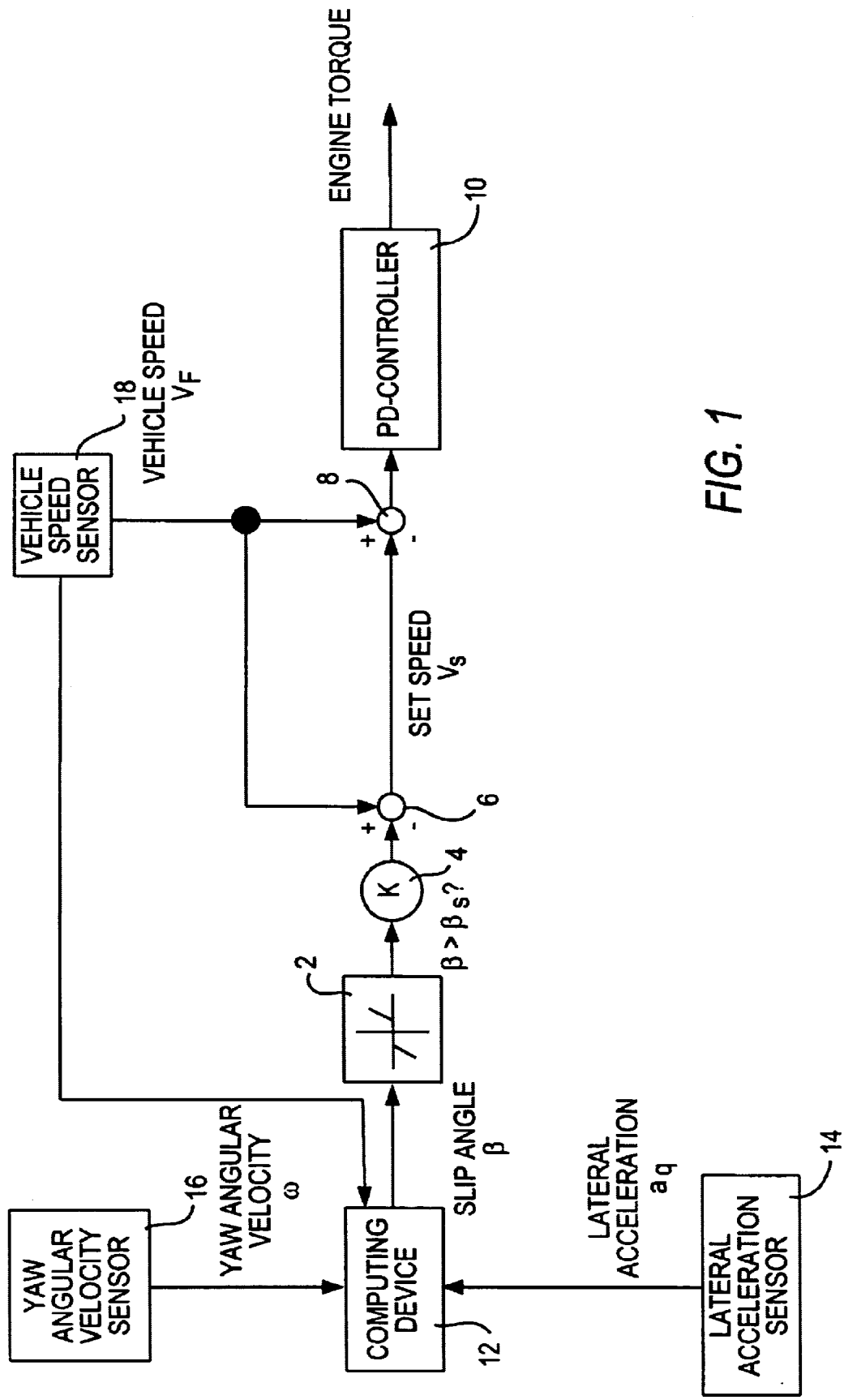
FIG. 1 is a block diagram of a system for controlling the cornering speed of a vehicle in accordance with a preferred embodiment of the present invention.

As a preliminary step in practicing a method or using an apparatus or device in accordance with a preferred embodiment of the present invention, the lateral acceleration $a_q$, the yaw angular velocity $\omega$ and the actual speed $v_F$ of the vehicle are determined continuously by means of sensors (14, 16 and 18, respectively). From the lateral acceleration $a_q$, the actual speed $v_F$ and the yaw angular velocity $\omega$, the respective body slip angle $\beta$ is computed according to the following formula:

$$\beta = \int \left(\omega - \frac{a_q}{v_F}\right) dt.$$

The body slip angle β is the angle between the longitudinal axis of the vehicle and the direction of motion.

The invention will be explained in more detail hereinafter on the basis of the block diagram shown in FIG. 1. The current, computed body slip angle β is compared with a predetermined body slip-angle threshold value $\beta_s$ in a threshold-value circuit 2. If the body slip angle exceeds the predetermined threshold value, the body slip angle is weighted with a constant K in a weighting circuit 4 and supplied to a summation point 6 as a correction value for the set speed $v_s$ of the vehicle. The vehicle set speed is obtained from the instantaneous actual speed $v_F$ of the vehicle, which is also supplied to summation point 6. This vehicle set speed $v_s$ is reduced in proportion to the body slip angle β by the correction value when the body slip angle exceeds the body slip-angle threshold value. The vehicle set speed reduced in this way by derivation from the instantaneous actual speed is supplied together with the actual speed $v_F$ of the vehicle to a second summation point 8. The control deviation (difference between set and actual values) calculated in second summation point 8 is supplied to a PD controller 10, which acts on the engine management function in such a way, and in particular changes the engine torque in such a way that the actual speed of the vehicle is adjusted to the set speed.

If the body slip angle β is smaller than the predetermined body slip-angle threshold, the correction value is zero, and so the set speed is carried to the actual speed $v_F$ of the vehicle, by the fact that the engine torque is released once again via second summation point 8 and PD controller 10, since the need for control no longer exists. The driver is able to accelerate once again. In this connection, the engine torque is preferably released at graduated rate, to ensure that it does not jump immediately to the maximum value.

Accordingly, a method and an apparatus are provided for simply and effectively adjusting the cornering speed of a vehicle to an optimum value by controlling the vehicle's engine as a function of the vehicle's body slip angle.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for controlling the cornering speed of a vehicle comprising the steps of determining a lateral acceleration and an actual speed of the vehicle, determining a yaw angular velocity of the vehicle, determining a body slip angle of the vehicle from the lateral acceleration, yaw angular velocity and actual speed of the vehicle, comparing the body slip angle with a predefined body slip-angle threshold value, taking a corrective control action in response to a deviation of the body slip angle from the body slip-angle threshold value, deriving a set speed and by means of the corrective control action, reducing the set speed of the vehicle, starting from the actual speed of the vehicle, whenever the body slip-angle threshold value is exceeded by the body slip angle.

2. The method according to claim 1, wherein the set speed is reduced in proportion to the body slip angle.

3. The method according to claim 1, wherein the corrective control action is action on the engine.

4. The method according to claim 3, wherein control of the engine torque is provided as the action on the engine.

5. The method according to claim 4, wherein, on view of the corrective control action, when the body slip angle becomes smaller than the body slip-angle threshold value, the set speed of the vehicle is carried to the actual speed of the vehicle, by the fact that the action on the engine has ended and the engine torque is released.

6. The method according to claim 5, wherein release of the engine torque takes place at a graduated rate.

7. A device for controlling the cornering speed of a vehicle having sensors for determining the speed and lateral acceleration of the vehicle comprising a sensor for the yaw angular velocity, a computing device for computing a body slip angle from the lateral acceleration, the yaw angular velocity and the actual speed of the vehicle, a threshold circuit for comparison of the body slip angle with a body slip-angle threshold value, a weighting circuit coupled to the output side of the threshold circuit, and which determines a correction value proportional to the determined body slip angle, a first summation point, in which a set speed of the vehicle is reduced from the actual speed of the vehicle by the correction value, a second summation point in which the actual speed of the vehicle is compared with the set speed of the vehicle in order to calculate a value of the control deviation, and a PD controller for adjusting the engine torque as a function of the value of the control deviation.

8. A method for controlling the cornering speed of a vehicle comprising the steps of determining a lateral acceleration and an actual speed of the vehicle, determining a yaw angular velocity of the vehicle, determining a body slip angle of the vehicle from the lateral acceleration, the yaw angular velocity and the actual speed of the vehicle, comparing the body slip angle with a body slip-angle threshold value, determining a vehicle set speed based at least in part on the comparison of the body slip angle with the body slip-angle threshold value, deriving a control deviation based on a difference between the set speed and the actual speed and, based on the control deviation, taking a corrective control action to control the speed of the vehicle.

9. The method according to claim 8, further comprising the step of weighting the body slip angle with a constant value to derive a correction value, if the body slip angle reaches the body slip-angle threshold value.

10. The method according to claim 8, further comprising the step of supplying the control deviation to a PD controller which acts on the engine torque to control the speed of the vehicle.

11. The method according to claim 9, wherein the vehicle set speed is reduced by the correction value when the body slip angle exceeds the body slip angle threshold.

12. The method according to claim 8, wherein when the body slip angle is smaller than the body slip-angle threshold value, the corrective control action is suspended and the set speed of the vehicle is carried to the actual speed of the vehicle once again.

13. A method for controlling the cornering speed of a vehicle comprising the steps of determining a body slip angle of the vehicle, comparing the body slip angle with a body slip-angle threshold value, and in response to a deviation of the body slip angle from the body slip-angle threshold value taking a corrective control action to the vehicle engine to control the speed of the vehicle.

14. The method according to claim 13, further comprising the steps of deriving a set speed and by means of the corrective control action, reducing the set speed of the vehicle, whenever the body slip-angle exceeds the body slip angle threshold value.

15. The method according to claim 13, wherein the corrective control action includes controlling the torque of the vehicle engine.

16. The method according to claim 13, wherein when the body slip angle and the body slip-angle threshold value become substantially identical in view of the corrective control action, the engine torque is released and the set speed is carried to the actual speed.

17. The method according to claim 13, wherein the body slip angle is derived from a lateral acceleration, a yaw angular velocity and an actual speed of the vehicle.

18. In a vehicle having sensors for determining at least one of the vehicle's speed, lateral acceleration and yaw angular velocity, an apparatus for controlling the cornering speed of the vehicle comprising a computing device for deriving a body slip angle, a threshold circuit for comparison of the body slip angle with a body slip-angle threshold value, a weighting circuit coupled to the output side of the threshold circuit, and which determines a correction value proportional to the body slip angle, a first summer, in which a set speed of the vehicle is reduced from the actual speed of the vehicle by the correction value, a second summer in which the actual speed of the vehicle is compared with the set speed of the vehicle in order to calculate a value of the control deviation, and means for performing a corrective action on the vehicle's engine to control the vehicle's speed.

19. The apparatus according to claim 18, wherein the means for performing a corrective action comprises a PD controller for adjusting the engine as a function of the value of the control deviation.

* * * * *